Jan. 16, 1968　　　　P. W. REMIG　　　　3,363,924
RELEASABLE TENSION HOLDER FOR REMOVABLE RECEPTACLE COVERS
Filed Dec. 30, 1965
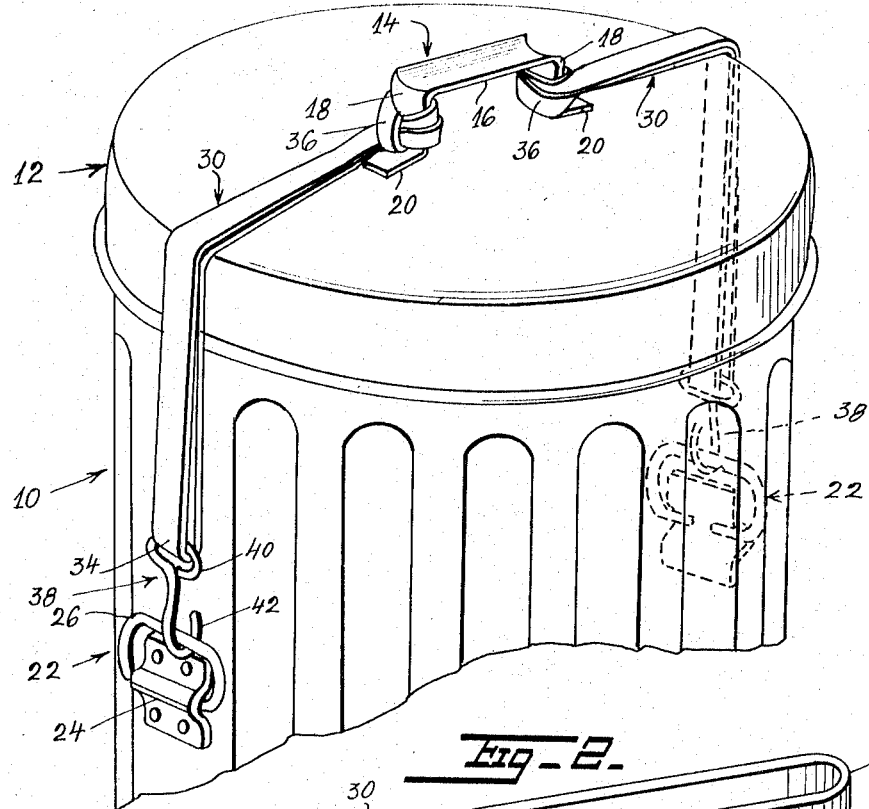
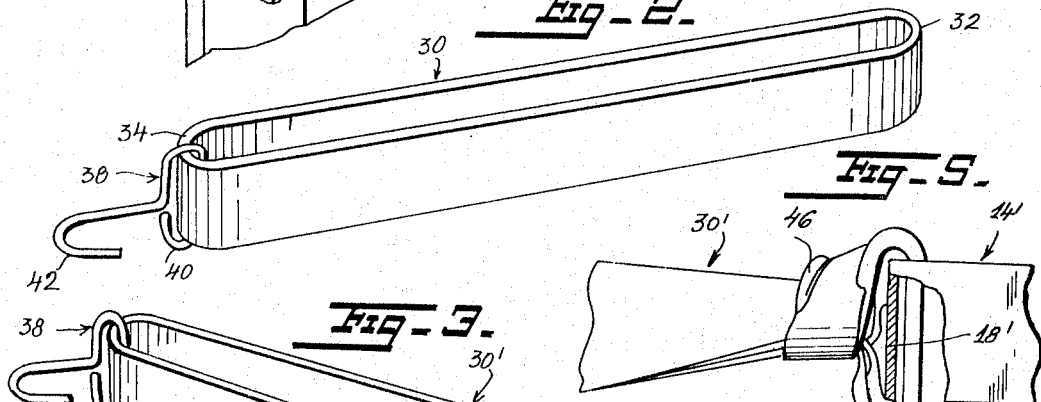
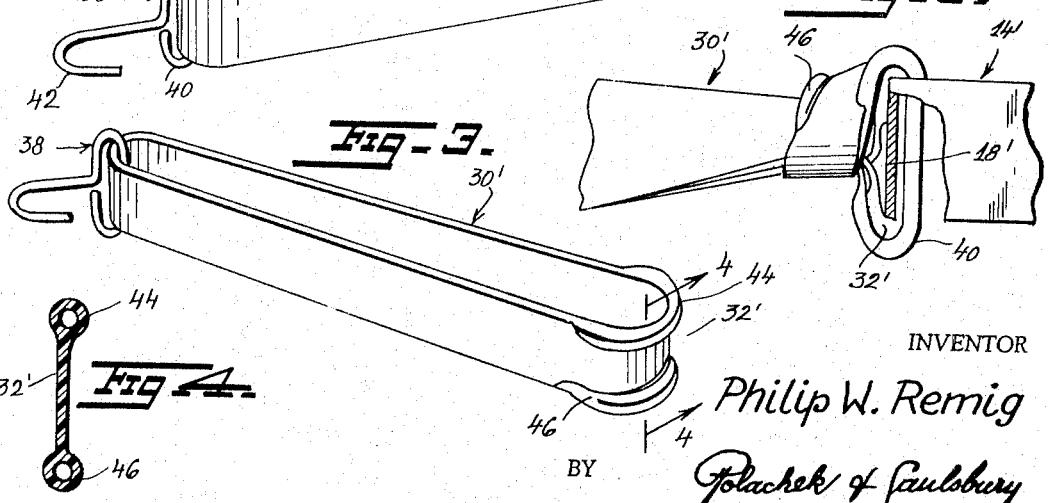
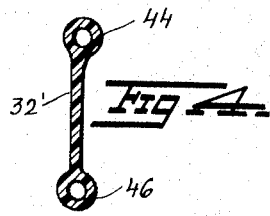
INVENTOR
Philip W. Remig
BY
Polachek & Saulsbury
ATTORNEYS United States Patent Office 3,363,924
Patented Jan. 16, 1968

3,363,924
RELEASABLE TENSION HOLDER FOR REMOVABLE RECEPTACLE COVERS
Philip W. Remig, Box 144, Rockaway Valley Road, Boonton, N.J. 07005
Filed Dec. 30, 1965, Ser. No. 517,590
4 Claims. (Cl. 292—258)

ABSTRACT OF THE DISCLOSURE

A cover holding device for a garbage can whereby the cover cannot be accidentally knocked off or blown off or removed by children, animals and the like. The holder device has a pair of elongated continuous flattened looped rubber bodies with curved ends, one end adapted to be secured to a can handle and the other end to the handle on the cover.

---

This invention relates to new and useful improvements in a device for releasably holding under tension a removable cover on a garbage can, trash can, ash can and the like.

A principal object of the present invention is to provide a device for retaining the removable cover or lid on a garbage, trash or ash can and the like so that the cover or lid will not be accidentally knocked off or blown off or removed by children, animals and the like.

Another object of the invention is to provide a cover or lid holder which is secured to the cover or lid itself to preclude loss of the holder when not in use.

Still another object of the invention is to provide a holder of this type with a body of stretchable plastic material to secure the cover or lid on the can.

Other objects of the invention are to provide a cover or lid holder of this type that is economical to manufacture on a mass production basis, is sturdy and durable, is capable of long service, life of severe usage; is convenient to attach and remove, will retain the cover or lid in place under adverse conditions, and has no parts to go out of order.

For further comprehension of the invention and of the objects and advantages thereof, reference will be had to the following description and accompanying drawing and to the appended claims in which the various novel features of the invention are more particularly set forth.

In the accompanying drawing forming a material part of this disclosure:

FIGURE 1 is a top perspective view of a fragment of a conventional garbage can with a cover thereon held by a holder embodying the invention.

FIG. 2 is a top perspective view of one of the cover holding devices shown in FIG. 1.

FIG. 3 is a similar view of a cover holding device embodying a modified form of the invention.

FIG. 4 is a sectional view taken on the line 4—4 of FIG. 3.

FIG. 5 is a top plan view of one end of the holder of FIG. 3 shown fastened to the handle of a cover of a garbage can, parts being shown broken away, parts being shown in section.

Referring now in detail to the various views of the drawing, in FIG. 1 is a conventional garbage can 10 shown with a removable cover or lid 12 in place thereon. The cover or lid has the usual center handle 14 with an inverted U-shaped body of metal including cross-piece 16 and depending end legs 18 with feet 20 fastened to the top of the cover or lid by welding or solder. This is conventional garbage can handle or hand grip construction. The can body is provided with the usual handle devices 22 on the sides thereof for manipulating the can. The handle devices each comprise a plate-like bearing member 24 riveted to the body of the can and a split ring or loop 26 hingedly secured in the bearing member.

The improved cover holding or retaining device is shown in detail in FIG. 2 and comprises a flattened continuous loop body 30 of suitable resilient material such as vinyl or butyl rubber. A body 8″ long, ⅞″ wide and ³⁄₃₂″ thick has been found satisfactory for the purpose. The rubber body has curved end portions 32 and 34. One end portion of the body for example portion 32, is adapted to be tied to one leg 18 of the handle 14 by tieing said one end portion around the leg and tying a knot 36 therein as seen in FIG. 1. The other end portion 34 of the body of the device is adapted to suspend loosely a metal hook device 38 having a flattened looped body 40 and a radial hook 42. For the hook device 38, a snap hook with spring may be used.

In use a pair of the improved holding devices are utilized for tying to the end legs 18 of the handle 14. The one end curved portion 32 of the looped body 30 is first tied to the appropriate leg 18 of the handle 14 with a knot 36 and the body 30 stretched or extended over the cover and downwardly over the body of the can until the hook 42 of the hook device 38 may be hooked or secured to the ring or loop 26 of the handle 22 on the side of the can. The bodies 30 are thus placed under tension and serve securely to hold the cover 12 in position upon the can 10.

In FIGS. 3 to 5, inclusive, a modified form of cover holding device 30′ is shown and differs from the holding device 30 of FIG. 1 in that one curved end portion of the body 30′, for example, curved end portion 32′ is formed with top and bottom thickened hollow edges 44 and 46, respectively. The thickened edges reinforce the holding device but do not interfere with tying and knotting the curved end portion to and around the leg 18′ of the handle 14′ as shown in FIG. 5.

It will be seen that there is herein provided an improved cover retainer for garbage cans, trash cans, ash cans and the like which satisfies all of the objectives of the instant invention and others including many advantages of great practical utility and commercial importance.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. In combination, a can body having an open upper end, diametrically opposite side handles spaced from the upper end of the body, a removable cover on said upper end having an inverted U-shaped handle at the center thereof, vertically and horizontally arranged loop bodies extending along opposite sides of the can body and over the cover between the center handle and the respective side handles, and means for connecting the upper ends of the loop bodies to the depending legs of the center handle on the cover, said means including loops and knots of the upper end of the loop bodies around the depending legs of the center handle, said loop bodies being detachably connected at their lower ends to the said side handles to tension the loop bodies, said looped bodies biasing the cover in the direction of the body.

2. A cover holding device for a garbage can and the like having a pair of side handles and a cover provided with an inverted U-shaped handle in the center of the top thereof, said cover holding device comprising a pair of elongated continuous flattened looped bodies of resilient plastic rubber, said bodies each having curved end portions, means for securing one end portion of each body to a leg of the cover handle, and means for securing the other end portion of each body to a can handle, the means for securing said one end portion consisting in tying and knotting said one end portion around the leg of the cover handle.

3. A cover holding device as defined in claim 2, wherein the means for securing the other end portion of each body to a can handle comprises a hook device with a looped body portion around said other curved end portion and with a radial hook for engaging a portion of the can handle.

4. A cover holding device as defiend in claim 2, wherein one end portion of each body has hollow thickened edges for reinforcing said end portion.

References Cited
UNITED STATES PATENTS

| | | | |
|---|---|---|---|
| 3,124,381 | 3/1964 | Geldart | 292—258 |
| 3,291,515 | 12/1966 | Lierman | 292—288 |

THERON E. CONDON, *Primary Examiner.*

GEORGE T. HALL, *Examiner.*